(12) United States Patent
Duroe

(10) Patent No.: US 10,994,934 B2
(45) Date of Patent: May 4, 2021

(54) CARRIER FOR HONEYCOMB BODY AND METHOD

(71) Applicant: Corning Incorporated, Corning, NY (US)

(72) Inventor: John Christian Duroe, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/777,097

(22) PCT Filed: Nov. 29, 2016

(86) PCT No.: PCT/US2016/063897
§ 371 (c)(1),
(2) Date: May 17, 2018

(87) PCT Pub. No.: WO2017/095763
PCT Pub. Date: Jun. 8, 2017

(65) Prior Publication Data
US 2018/0334328 A1 Nov. 22, 2018

Related U.S. Application Data

(60) Provisional application No. 62/260,949, filed on Nov. 30, 2015.

(51) Int. Cl.
*B65G 9/00* (2006.01)
*B28B 11/24* (2006.01)
(Continued)

(52) U.S. Cl.
CPC ............... *B65G 9/002* (2013.01); *B28B 3/20* (2013.01); *B28B 11/241* (2013.01);
(Continued)

(58) Field of Classification Search
CPC ..... B65G 9/002; B28B 2003/203; B66C 1/12; B66C 1/16; B66C 1/18; B64D 1/10; B64D 1/22
See application file for complete search history.

(56) References Cited

U.S. PATENT DOCUMENTS 3,947,064 A * 3/1976 Skoting ............... B66C 1/16
                                                 294/67.4
5,322,656 A * 6/1994 Pallesen .............. B28B 7/46
                                                 249/113
(Continued)

FOREIGN PATENT DOCUMENTS

CN 103274308 A 9/2013
CN 104213960 A 12/2014
(Continued)

OTHER PUBLICATIONS

International Search Report and Written Opinion of the International Searching Authority; PCT/US2016/063897; dated Mar. 20, 2017; 14 Pages; European Patent Office.
(Continued)

*Primary Examiner* — Gerald McClain
(74) *Attorney, Agent, or Firm* — Kurt R. Denniston

(57) ABSTRACT

A carrier (230) for a honeycomb body (220) and a method for manufacturing a honeycomb body (220) are provided. The carrier (230) comprises a first side support (234), a second side support (236), and a flexible sheet (240) suspended between the first (234) and second (236) side supports for supporting the honeycomb body (220). The method comprises placing a green honeycomb body (220) on the flexible sheet (240) and transporting the green honeycomb body (220).

10 Claims, 7 Drawing Sheets

(51) Int. Cl.
  *B65G 49/08* (2006.01)
  *F26B 15/14* (2006.01)
  *F26B 3/347* (2006.01)
  *B28B 3/20* (2006.01)

(52) U.S. Cl.
  CPC .......... *B28B 11/243* (2013.01); *B28B 11/248* (2013.01); *B65G 49/08* (2013.01); *F26B 3/347* (2013.01); *F26B 15/14* (2013.01); *B28B 2003/203* (2013.01)

(56) References Cited

U.S. PATENT DOCUMENTS

| | | |
|---|---|---|
| 6,663,378 B2 | 12/2003 | Grover et al. |
| 8,075,240 B2 * | 12/2011 | Stevenson ................ B60J 7/102 414/607 |
| 9,073,234 B2 | 7/2015 | Ito et al. |
| 9,085,089 B2 | 7/2015 | Noni et al. |
| 2004/0164464 A1 | 8/2004 | Lubberts et al. |
| 2011/0083942 A1 | 4/2011 | Tajima et al. |
| 2012/0301229 A1 | 11/2012 | Yorio |
| 2014/0343721 A1 | 11/2014 | Duroe et al. |
| 2015/0108680 A1 | 4/2015 | Beecher et al. |
| 2015/0210024 A1 | 7/2015 | Koide et al. |

FOREIGN PATENT DOCUMENTS

| | | | |
|---|---|---|---|
| DE | 69108541 T2 | 10/1995 | |
| DE | 102006010393 B4 | 6/2010 | |
| EP | 1829658 A2 * | 9/2007 | ............... B28B 3/20 |
| WO | WO1995032917 A1 * | 12/1995 | |

OTHER PUBLICATIONS

English Translation of CN201680070008.2 First Office Action dated May 14, 2019, China Patent Office, 11 pgs.

* cited by examiner

CARRIER FOR HONEYCOMB BODY AND METHOD

CROSS-REFERENCE TO RELATED APPLICATIONS

This application is a national stage application under 35 U.S.C. § 371 of International Patent Application Serial No. PCT/US2016/063897, filed on Nov. 29, 2016, which claims the benefit of priority of U.S. Provisional Application Ser. No. 62/260,949, filed on Nov. 30, 2015, the contents of which are relied upon and incorporated herein by reference in their entireties.

BACKGROUND

Field

Exemplary embodiments of the present disclosure relate to a carrier for a honeycomb body and methods of manufacturing and, more particularly, to a flexible sheet carrier for extruded ceramic ware and methods of manufacturing ceramic honeycomb bodies.

Discussion of the Background

After-treatment of exhaust gas from internal combustion engines may use catalysts supported on high-surface area substrates and, in the case of diesel engines and some gasoline direct injection engines, a catalyzed or non-catalyzed filter for the removal of carbon soot particles. Porous ceramic flow-through honeycomb substrates and wall-flow honeycomb filters may be used in these applications.

Wet honeycomb extrudate is relatively quite soft and subject to damage in the course of further handling, particularly until it has been dried.

Handling can cause shape distortion in wet honeycomb shapes comprising thin web and skin structures, or where especially large and heavy extrudate sections need to be transported. Further, extrudate sections of large diameter or frontal area transverse to the axis of extrusion can suffer from distortion and collapse of the honeycomb channel structure as that structure must bear the weight and withstand the lateral weight shifts of the upper structure in the course of transport.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a carrier for a honeycomb body.

Exemplary embodiments of the present disclosure also provide a method of manufacturing a porous ceramic honeycomb body.

Additional features of the disclosure will be set forth in the description which follows, and in part will be apparent from the description, or may be learned by practice of the disclosure.

An exemplary embodiment discloses a carrier for a honeycomb body. The carrier comprises a first side support, a second side support, and a flexible sheet suspended between the first and second side supports for supporting the honeycomb body.

Another exemplary embodiment discloses a method of manufacturing a honeycomb body. The method comprises providing a honeycomb body carrier, the carrier comprising a first side support, a second side support, and a flexible sheet suspended between the first and second side supports for supporting the honeycomb body. The method comprises placing a green honeycomb body on the flexible sheet and transporting the honeycomb body.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION

Figure 1:
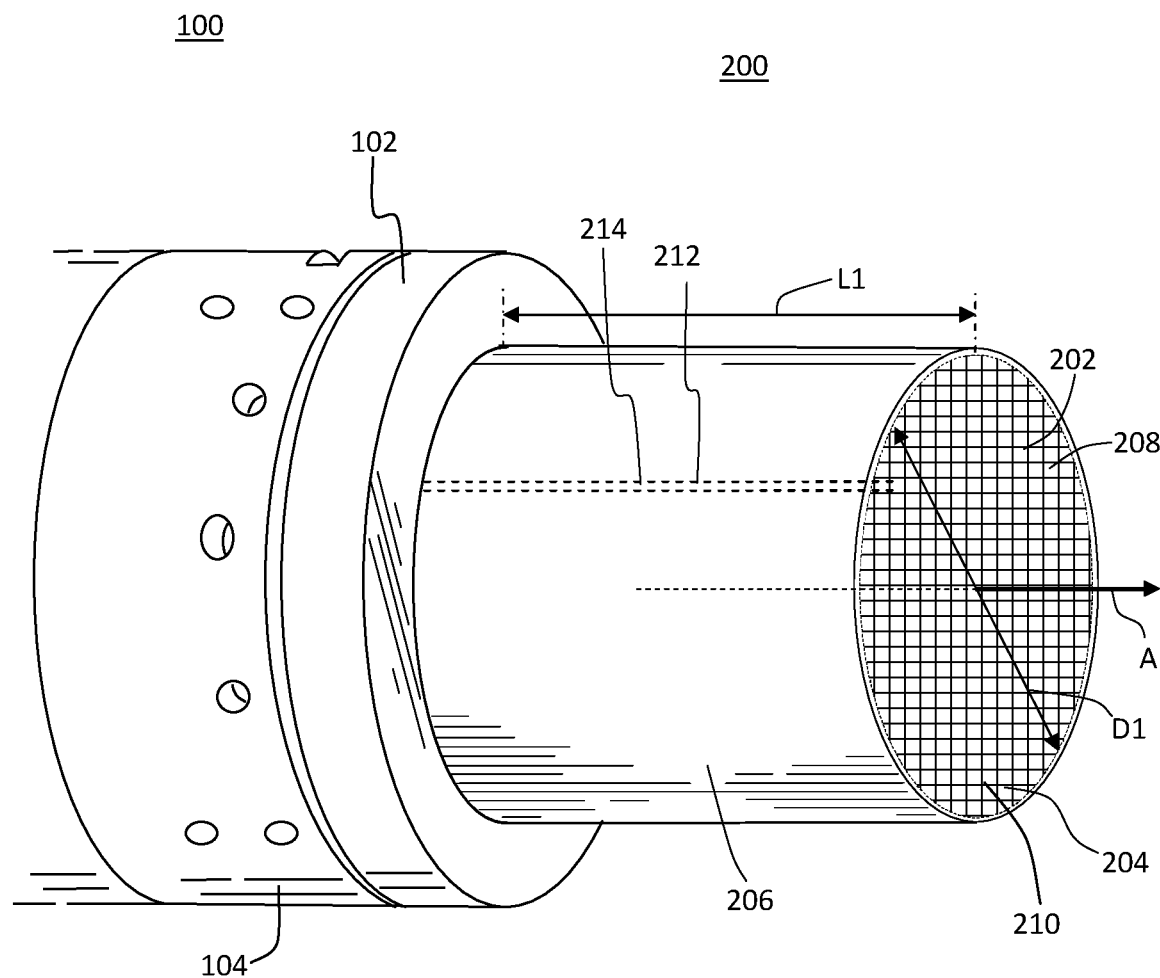
FIG. 1 is a schematic illustration of an extruder front end and a honeycomb extrudate.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on", "connected to", or "adjacent to"

another element or layer, it can be directly on, directly connected to, or directly adjacent to the other element or layer, or intervening elements or layers may be present. In contrast, when an element or layer is referred to as being "directly on", "directly connected to", or "directly adjacent to" another element or layer, there are no intervening elements or layers present. Like reference numerals in the drawings denote like elements. It will be understood that for the purposes of this disclosure, "at least one of X, Y, and Z" can be construed as X only, Y only, Z only, or any combination of two or more items X, Y, and Z (e.g., XYZ, XYY, YZ, ZZ). When describing a value in a range from A to B, it will be understood that the end points A and B are included in the range.

In these exemplary embodiments, the disclosed article, and the disclosed method of making the article provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

Exemplary embodiments of the disclosure relate to an improved carrier for a honeycomb body and a method of manufacturing a porous ceramic honeycomb body.

The manufacture of porous ceramic honeycomb bodies may be accomplished by the process of plasticizing ceramic powder batch mixtures, extruding the mixtures through honeycomb extrusion dies to form honeycomb bodies, and cutting, drying, and firing the bodies to produce porous ceramic honeycomb bodies of high strength and thermal durability having channels extending axially from a first end face to a second end face. Upon exiting the extruder in an axial direction, the batch stiffens into a wet extrudate comprising a network of axially extending intersecting walls (webs) that form axially extending channels and an axially extending outer peripheral surface. The webs and channels comprise the matrix. Disposed at the outer periphery of the matrix is the outer peripheral surface. The outer peripheral surface may be referred to herein as a co-extruded skin, an integrally formed co-extruded skin, or skin. A green ware honeycomb body or porous ceramic honeycomb body extruded with the skin on the matrix is referred to herein as an extrude-to-shape honeycomb body. As used herein a ceramic honeycomb body includes ceramic honeycomb monoliths and ceramic segmented honeycomb bodies, as well as the honeycomb body segments. As used herein honeycomb body can refer to a wet or dried green ware, or fired ware, honeycomb extrudate, honeycomb log, honeycomb piece, or honeycomb article.

A co-extruded or an after-applied exterior skin may form an outer peripheral surface extending axially from a first end face to a second end face of the ceramic honeycomb body. Each channel of the honeycomb body defined by intersecting walls (webs), whether monolithic or segmented, can be plugged at an inlet face or an outlet face to produce a filter. When some channels are left unplugged a partial filter can be produced. The honeycomb body, whether monolithic or segmented, can be catalyzed to produce a substrate. A non-plugged honeycomb body is generally referred to herein as a substrate. The catalyzed substrate can have an after applied catalyst or comprise an extruded catalyst. Further, filters and partial filters can be catalyzed to provide multifunctionality. The ceramic honeycomb bodies thus produced are widely used as catalyst supports, membrane supports, as wall-flow filters, as partial filters, and as combinations thereof for cleaning fluids such as purifying engine exhausts.

Ceramic honeycomb body compositions are not particularly limited and can comprise major and minor amounts of cordierite, aluminum-titanate, mullite, β-spodumene, silicon carbide, zeolite and the like, and combinations thereof. As a further example, the ceramic honeycomb body can comprise an extruded zeolite or other extruded catalyst.

Handling and drying of wet extruded honeycomb ceramic articles can include placing the article on a ceramic fiber carrier that has a contour that closely matches the extruded article. The carrier can then be introduced into a dryer. The carrier can provide support for the article and prevent the wet ceramic from some deformation. Often ceramic articles have varying diameter along the length or may have a slight curvature. When placed in a ridged carrier, point contact may be established which may damage the wet ceramic. Providing additional clearance in the carrier can be counterproductive as it eliminates proper support. In addition, the carriers are specifically designed in close tolerance to the contour of the wet ceramic and can only be used for that specific product, meaning that each product has a unique carrier design. Several hundred carriers are required so there is a significant expense and logistical complexity involved with managing the dryer carriers. The carrier according to exemplary embodiments of the disclosure described herein is a universal design that eliminates product specific carriers and provides superior product support by eliminating point contact. The universal carrier comprises a flexible sheet suspended between two supports to create a trough to cradle the wet ceramic article to minimize deformation during transport.

FIG. 1 is a schematic illustration of an extruder and a honeycomb extrudate. The extruder can include a front end 102 where the batch exits the extruder 100 as the honeycomb extrudate 200. An extruder cartridge 104 can include extrusion hardware including an extrusion die and skin forming mask. The honeycomb extrudate 200 has a length L1 and includes a first end face 202 and an outer peripheral surface 206 extending from the extruder front end 102 to the first end face 202. A plurality of intersecting walls 208 that form mutually adjoining channels 210 extend in the extrusion direction indicated by axial direction "A" and form a honeycomb matrix. Intersecting walls 212 forming a channel 214 extending in the extrusion direction are shown for illustration. A maximum cross sectional dimension perpendicular to the axial direction is indicated by "D1". For example, when the honeycomb extrudate 200 is a cylinder shape, the maximum dimension "D1" may be a diameter of an end face 202. For example, when the honeycomb extrudate 200 cross section perpendicular to the axial direction is a rectangular shape, the maximum dimension "D1" may be a diagonal of an end face.

Cell density of the honeycomb extrudate 200 can be between about 100 and 900 cells per square inch (cpsi). Typical cell wall thicknesses can range from about 0.025 mm to about 1.5 mm (about 1 to 60 mil). For example, honeycomb extrudate 200 geometries may be 400 cpsi with a wall thickness of about 8 mil (400/8) or with a wall thickness of about 6 mil (400/6). Other geometries include, for example, 100/17, 200/12, 200/19, 270/19, 600/4, 400/4, 600/3, 750/2, and 900/2. As used herein, honeycomb extrudate 200 is intended to include a generally honeycomb structure but is not strictly limited to a square structure. For example, hexagonal, octagonal, triangular, rectangular or any other suitable cell shape may be used. Also, while the cross section of the honeycomb extrudate 200 is illustrated as circular, it is not so limited, for example, the cross section can be elliptical, square, rectangular, or other desired shape, and a combination thereof.

The batch material upon exiting the extruder front end 102 can be a wet green honeycomb extrudate 200 that can be cut to length L1 forming a second end face (not shown) to form a wet green honeycomb log 220. The outer peripheral surface 206 of the wet green honeycomb log 220 can extend axially from the first end face 202 to the second end face. The wet green honeycomb log 220 can be transported to a dryer on a support tray suitable for supporting a length of extrudate 200 such as a log 220 for transport to a dryer. Tray features may include an axial length and a transverse cross-section revealing a concave portion defining a support surface, that surface being configured to support the log 220. The longitudinal axis of the tray and the section of extrudate forming log 220 may be parallel to the direction of extrusion and to the orientation of honeycomb channels in that section of extrudate.

Examples of trays to support honeycomb extrudate are provided in U.S. Pat. No. 8,407,915, issued Apr. 2, 2013, and U.S. Pat. No. 9,085,089, issued Jul. 21, 2015, both of which are hereby incorporated by reference in their entireties as if fully set forth herein.

The honeycomb extrudate 200 can have a bow when it exits the extrusion die of the extruder front end 102. Examples of extrudate bow corrector devices for correcting bow in a stream of extruded material are provided in U.S. Pat. No. 6,663,378, issued Dec. 16, 2003, U.S. patent application Ser. No. 10/370,840 and Publication No. 2004/0164464, published Aug. 26, 2004, and U.S. patent application Ser. No. 14/061,129 and Publication No. 2015/0108680, filed on Oct. 23, 2013, all of which are hereby incorporated by reference in their entireties as if fully set forth herein.

The bow in the honeycomb extrudate 200 may not be correctable by the bow corrector device. When a wet green honeycomb log 220 comprises bow it may not be supported along the tray contour, the concave portion defining the support surface configured to support the log 220. Furthermore, the tray contour can be specific to the contour of the wet green honeycomb log 220.

Figure 2:
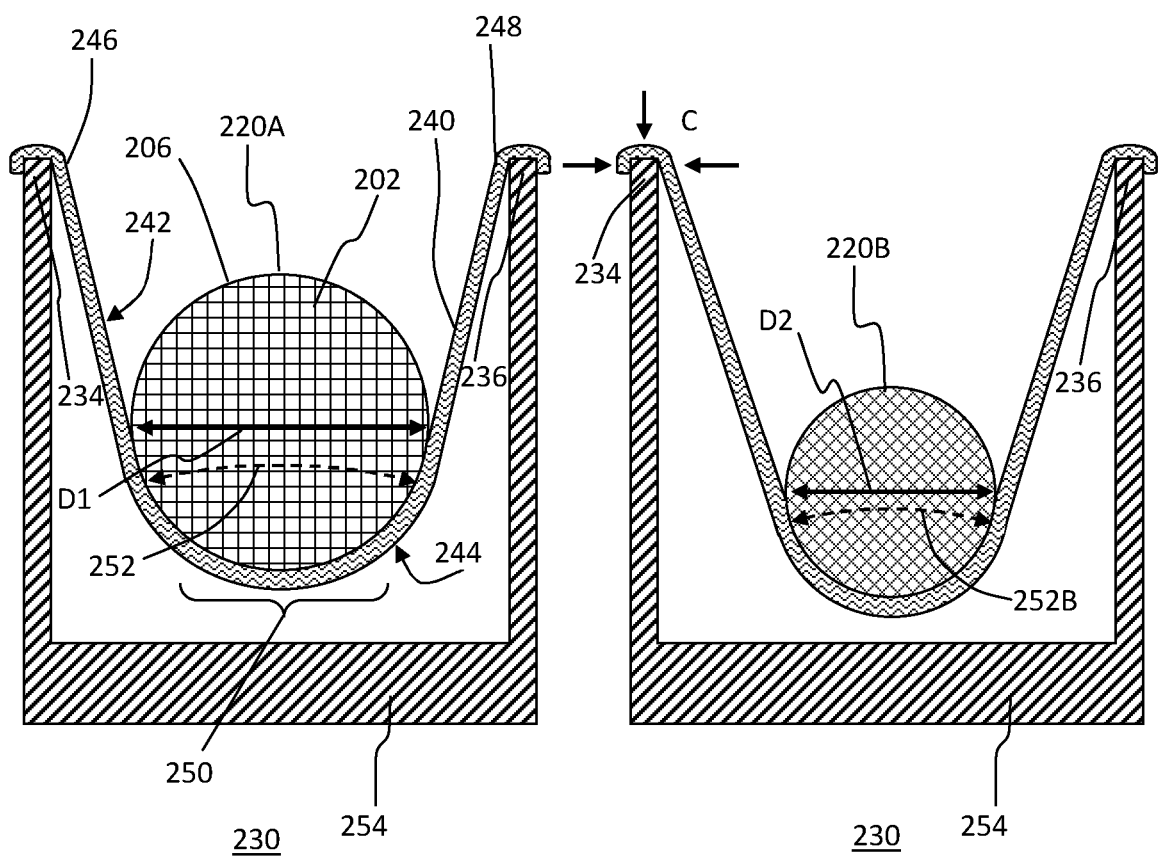
FIG. 2 presents a schematic end view of a carrier supporting a honeycomb body of a first diameter on the left and a honeycomb body of a second diameter smaller than the first diameter on the right according to exemplary embodiments of the disclosure.

FIG. 2 presents a schematic end view of a universal carrier 230 supporting a wet green honeycomb log 220A of a first diameter D1 on the left and a wet green honeycomb log 220B of a second diameter D2 smaller than the first diameter D1 on the right according to exemplary embodiments of the disclosure. The carrier 230 includes a first side support 234 extending in a longitudinal direction into the plane of the drawing of FIG. 2, a second side support 236 extending in the longitudinal direction, and a flexible sheet 240. The flexible sheet 240 includes a support surface 242 and an opposing back surface 244, a sheet first side region 246 connected to the first side support 234, a sheet second side region 248 connected to the second side support 236, and a center portion 250 hanging from the first sheet side region 246 and the second sheet side region 248 to define a contour area 252 of the support surface 242 configured to support a honeycomb body, that is, the wet green honeycomb log 220A. The sheet side regions 246, 248 can be connected to the side supports 234, 236 at any position such as indicated by arrows "C".

According to these exemplary embodiments the flexible sheet 240 center portion 250 hangs from the sheet first side region 246 connected to the first side support 234 and the sheet second side region 248 connected to the second side support 236 into empty space. The first side support 234 and the second side support 236 can be disposed on a tray base 254 below the flexible sheet 240 such that the back surface 244 of the flexible sheet 240 is disposed spaced apart from a top surface of the tray base 254 by a first level. The tray base 254 can have a bottom surface configured to be disposed on a conveyor to transport the carrier 230. For example, the tray base 230 can be configured to move on an air bearing or a conveyor belt.

When the wet green honeycomb log 220A is disposed in the contour area 252 defined by the support surface 242 in the center portion of the flexible sheet 240 the back surface 244 of the flexible sheet 240 is disposed spaced apart from a top surface of the tray base 254 by a second level greater than the first level. When the wet green honeycomb log 220B having a diameter less than the diameter of the wet green honeycomb log 220A is disposed in the contour area 252 defined by the support surface 242 in the center portion of the flexible sheet 240 the back surface 244 of the flexible sheet 240 is disposed spaced apart from a top surface of the tray base 254 by a third level less than the second level but greater than the first level. As illustrated in FIG. 2, the same carrier 230 can support and transport the wet green honeycomb log 220A of the first diameter D1 and the wet green honeycomb log 220B of the second diameter D2 smaller than the first diameter D1.

Figure 3:
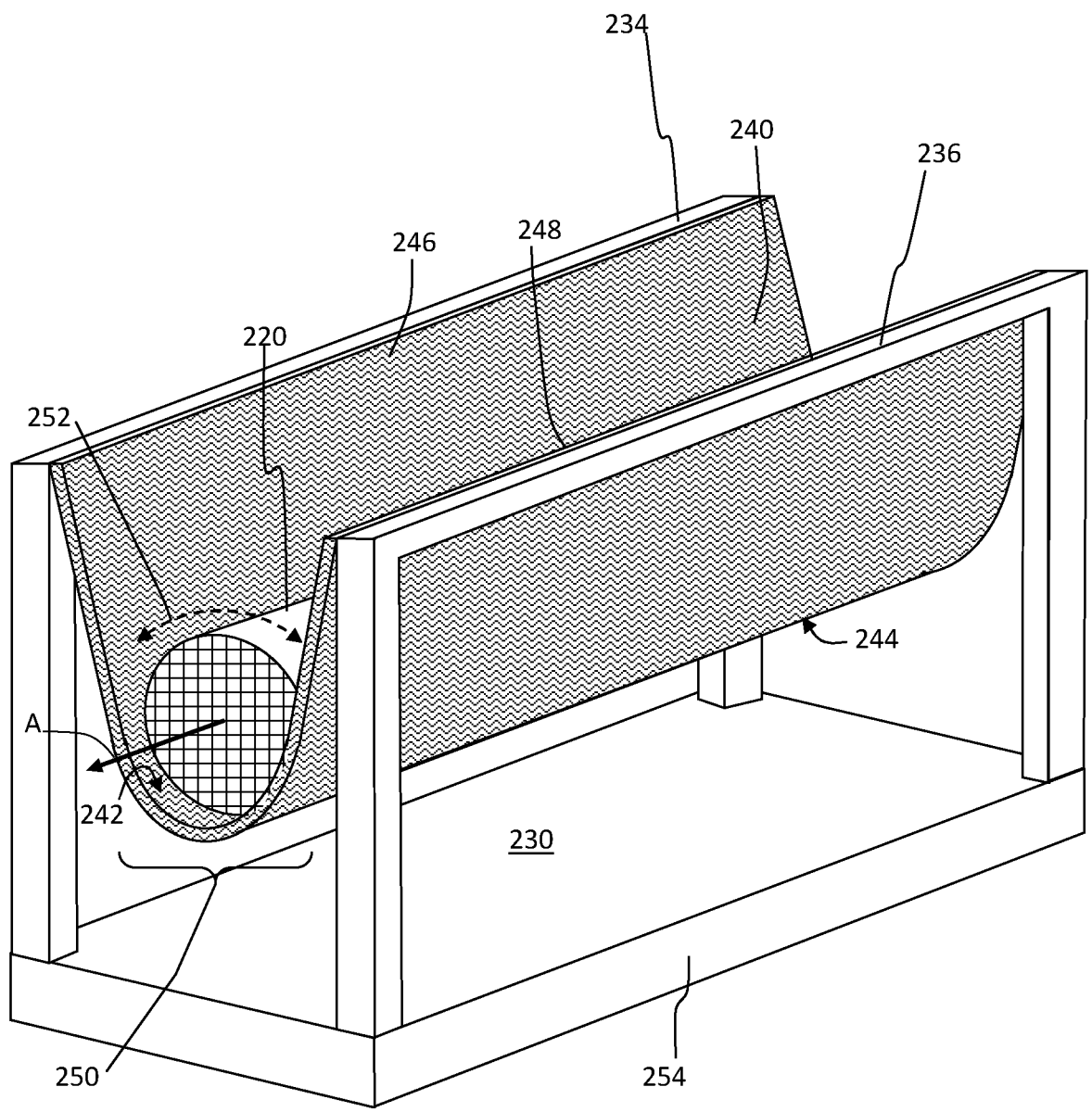
FIG. 3 is a schematic illustration of a carrier supporting a honeycomb body according to exemplary embodiments of the disclosure.

FIG. 3 is a perspective schematic illustration of the carrier 230 supporting a honeycomb body 220 according to exemplary embodiments of the disclosure. The side supports 234, 236 can be adjustable relative to one another in a transverse direction, transverse to the longitudinal direction. One of the side supports 234, 236 may be adjustable and the other may be fixed, or they may both be adjustable. As the side supports 234, 236 are adjusted further from each other, the flexible sheet 240 center sheet portion 250 opens and as the side supports 234, 236 are adjusted closer to each other, the flexible sheet 240 center sheet portion 250 closes. As the center sheet portion 250 closes it can support more of the circumference of the honeycomb body 220 disposed in the contour area 252 with the support surface 242. As the center sheet portion 250 opens it can support less of the circumference of the honeycomb body 220 disposed in the contour area 252 with the support surface 242.

When the side supports 234, 236 are spaced apart a first distance the flexible sheet center can hang to a first level and when the side supports 234, 236 are spaced apart a second distance less than the first distance the flexible sheet can hang to a second level greater than the first level. Furthermore, the side supports 234, 236 can move transversely and up and down to lift or set the flexible sheet 240 while closing or opening the flexible sheet 240 center sheet portion 250.

Figure 4:
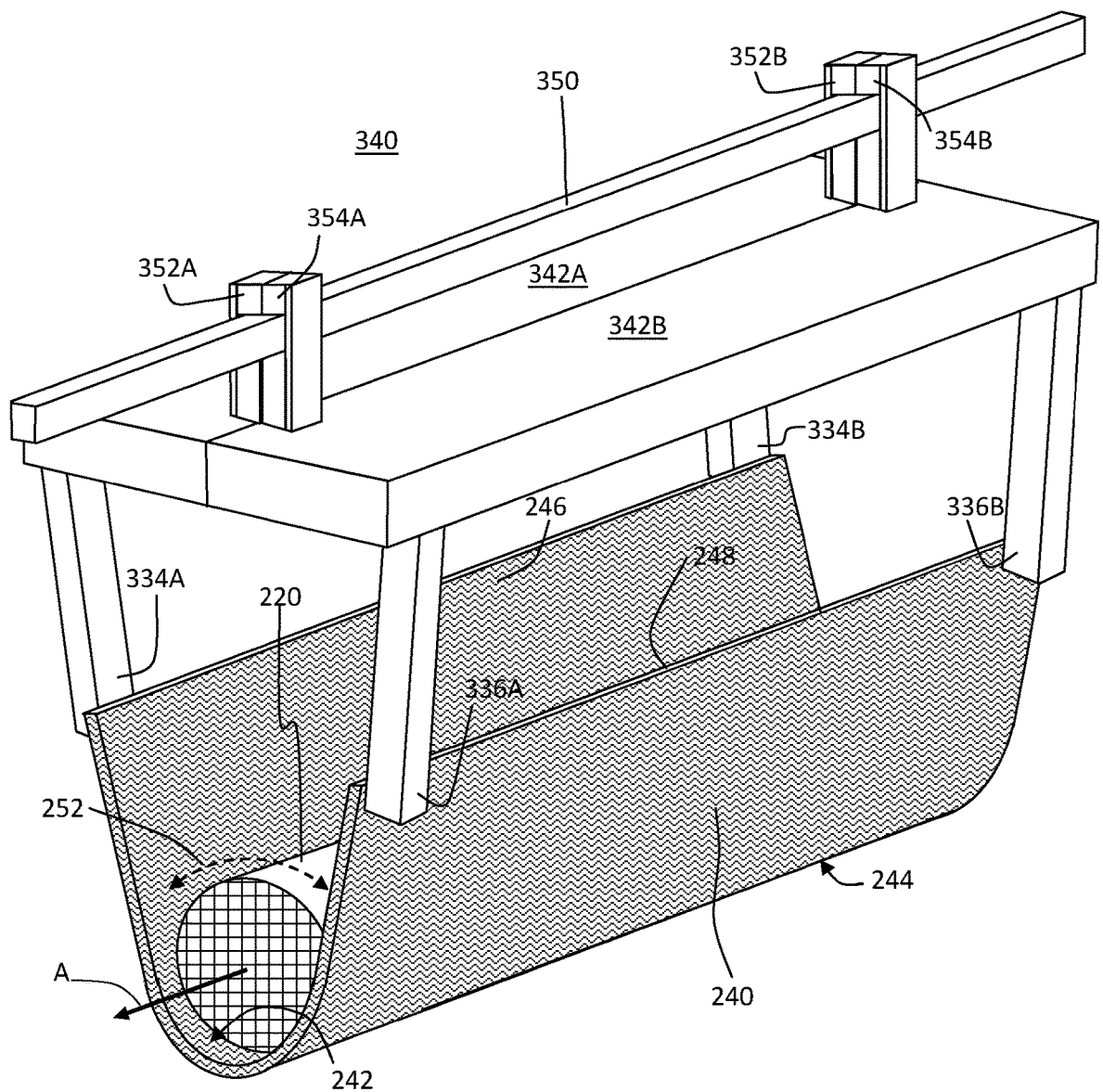
FIG. 4 is a schematic illustration of a carrier supporting a honeycomb body according to another exemplary embodiment of the disclosure.

FIG. 4 is a schematic illustration of a carrier 310 supporting a honeycomb body 220 according to another exemplary embodiment of the disclosure. According to these exemplary embodiments the flexible sheet 240 center portion 250 hangs from the sheet first side region 246 connected to the first side support 334A, 334B and the sheet second side region 248 connected to the second side support 336A, 336B into empty space. That is, the first side support 234 can comprise a front first side support 334A and a back first side support 334B spaced apart from the front first side support 334A in the longitudinal direction. The second side support 236 can comprise a front second side support 336A and a back second side support 336B spaced apart from the front second side support 336A in the longitudinal direction. The first side support 334A, 334B and the second side support 336A, 334B can be disposed on a tray base 340 above the flexible sheet 240.

The tray base 340 can have a top surface configured to couple to an overhead conveyor 350 such as a rail or cable system to transport the carrier 310. For example, the tray base 340 can be comprised of a first longitudinal section 342A and a second longitudinal section 342B separable from the first longitudinal section 342A. The tray base longitudinal sections 342A, 342B can be adjustable relative to one another in a transverse direction, transverse to the longitudinal direction. As the tray base longitudinal sections 342A, 342B are adjusted further from each other, the flexible sheet 240 center sheet portion 250 opens and as the tray base longitudinal sections 342A, 342B are adjusted closer to each other, the flexible sheet 240 center sheet portion 250 closes. As the center sheet portion 250 closes it can support more of the circumference of the honeycomb body 220 disposed in the contour area 252 with the support surface 242. As the center sheet portion 250 opens it can support less of the circumference of the honeycomb body 220 disposed in the contour area 252 with the support surface 242.

Furthermore, the tray base longitudinal sections 342A, 342B can be adjusted away from each other for loading a honeycomb body 220 onto the support surface 242 center sheet portion 250 in the contour area 252. The tray base longitudinal sections 342A, 342B can be adjusted toward each other to couple to the overhead conveyor 350. For example, the first tray base longitudinal section 342A can have front and back coupling members 352A, 352B and the second tray base longitudinal section 342B can have front and back coupling members 354A, 354B. The front coupling members 352A, 354A can attach to each other and to the overhead conveyor 350, and back coupling members 3526, 354B can attach to each other and to the overhead conveyor 350 to transport the carrier 340 and honeycomb body 220.

The material of the first side support, the second side support, the tray base, and the flexible sheet are not particularly limited. However, the carrier may transport the honeycomb body through a dryer including microwave radiation to dry the honeycomb body. Accordingly, the first side support, the second side support, the tray base, and the flexible sheet can comprise low dielectric loss material. Low dielectric loss material is understood to be suitable for use in microwave dryers. For example, the first side support, the second side support, and the tray base can comprise at least one of alumina and aluminosilicate fibers. For example, the flexible sheet comprises at least one of a woven or non-woven material, for example, the flexible sheet comprises at least one of silicone, polypropylene, extreme temperature silicone rubber, canvas, urethane, and fiberglass. Furthermore, the flexible sheet 240 can comprise a web with open areas such as a fish net.

The method of manufacturing a honeycomb body comprises providing a honeycomb body carrier 230, 340, the carrier 230, 340 comprising a first side support 234, 334A, 334B extending in a longitudinal direction, a second side support 236, 336A, 336B extending in the longitudinal direction, and a flexible sheet 240 comprising a support surface 242 and opposing back surface 244, a sheet first side region 246 connected to the first side support 234, 334A, 334B, a sheet second side region 248 connected to the second side support 236, 336A, 336B, and a center portion 250 hanging from the first sheet side region 246 and the second sheet side region 248 to define a contour area 252 of the support surface 242 configured to support a honeycomb body 220; placing a green honeycomb body 220 on the support surface 242 in the contour area 252; and transporting the carrier 230, 340 having the green honeycomb body 220 disposed thereon.

Figure 5:
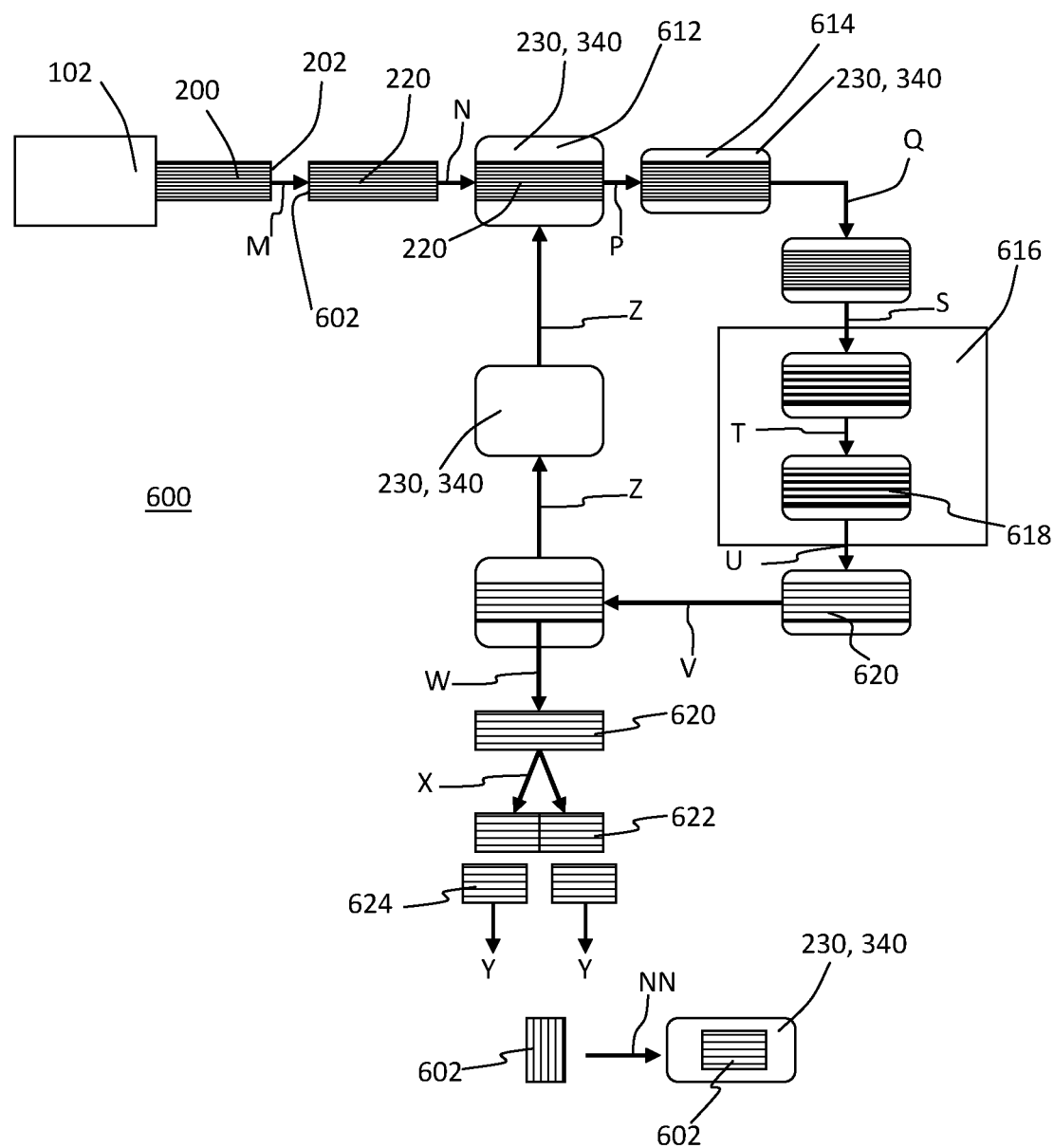
FIG. 5 is a schematic diagram of a manufacturing method for a honeycomb body according to exemplary embodiments of the disclosure.

FIG. 5 is a schematic diagram of a manufacturing method 600 for a honeycomb body 602 according to exemplary embodiments of the disclosure. A honeycomb extrudate 200 can be extruded from a front end 102 of an extruder 100. At operation M, the extrudate 200 can be cut to form a wet green honeycomb log 220 having a second end face 602. At operation N the wet green honeycomb log 220 can be placed on a carrier 230, 340. The carrier 230, 340 can optionally be in an open position 612 or in a fixed/closed position 614.

For example, placing the wet green honeycomb log 220 on the carrier 230, 340 can include separating the first side support 234 from the second side support 236 in a transverse direction, placing the green honeycomb log 220 on the support surface 242, and bringing the first side support 234 and the second side support 236 toward one another in the transverse direction. For example, the placing can include extruding the green honeycomb log 220 on the support surface 242. For example, placing the wet green honeycomb log 220 on the carrier 230, 340 can include lifting the green honeycomb log 220 and setting the green honeycomb log 220 on the support surface 242. For example, placing the wet green honeycomb log 220 on the carrier 230, 340 can include lowering the green honeycomb log 220 through bomb bay doors of an air bearing tray on to the support surface 242 when the extrudate 200 is extruded onto an air bearing. For example, placing the wet green honeycomb log 220 on the carrier 230, 340 can include lifting a release member such as parchment paper having the wet green honeycomb log 220 disposed thereon and setting the release member and the green honeycomb log 220 on to the support surface 242.

The carrier 230, 340 may safely transport the wet green honeycomb log 220 to a drying oven in operation Q. For example, the transportation path may include turns where the carrier can be subjected to forces lateral to the extrusion direction without damage to the wet green honeycomb log 220. At operation S the carrier 230, 340 having the wet green honeycomb log 220 disposed thereon may enter a dryer 616 wherein the wet green honeycomb log 220 may become a semi-dry green honeycomb log 618 in operation T. In some of these exemplary embodiments the dryer 616 can include a microwave dryer. At operation U the carrier 230, 340 exits the dryer 616 having the wet green honeycomb log 220 disposed thereon dried to a dry green honeycomb log 620. In operation V, the carrier 230, 340 may open or remain in a fixed position. In operation W the dried green honeycomb log 620 can proceed to additional processing such as cutting at operation X to section the dry green honeycomb log 622 to form a dry honeycomb piece 624, and firing the dry honeycomb piece 624 at operation Y. Further processing of the fired honeycomb body 602 can include contouring, skinning, plugging, catalyzing, canning, and the like, and combinations thereof.

At operation Z, the carrier 230, 340 can be returned empty to receive another wet honeycomb log 220. At operation NN, the fired honeycomb body 602 can be loaded on a universal carrier 230, 340 for transporting to inspection, packaging, etc.

Figure 6:
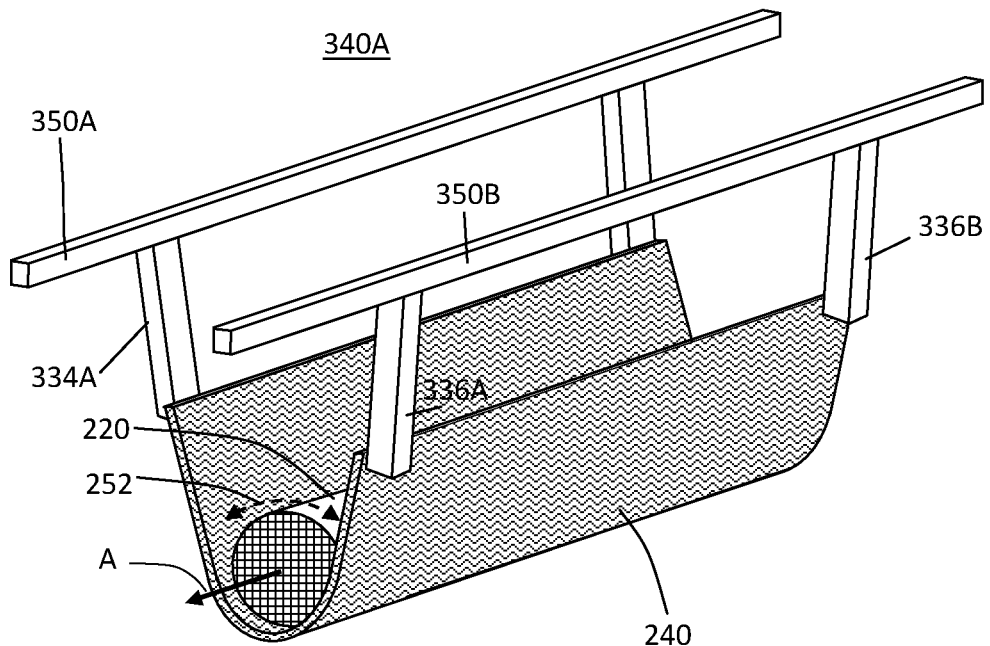
FIG. 6 is a schematic illustration of a carrier supporting a honeycomb body according to another exemplary embodiment of the disclosure.

FIG. 6 is a schematic illustration of a carrier 340A supporting a honeycomb body 220 according to another exemplary embodiment of the disclosure. In this exemplary embodiment the first side support 334A, 334B is configured to couple to a first rail 350A, and the second side support 336A, 336B is configured to couple to a second rail 350B. The first rail 350A and the second rail 350B can be overhead at an elevation or level above the flexible sheet 240, which hangs down due to the force of gravity, or the first rail 350A and the second rail 350B can be at various positions relative to the flexible sheet 240 and the honeycomb body 220 as shown in FIGS. 7A and 7B.

Figure 7A:
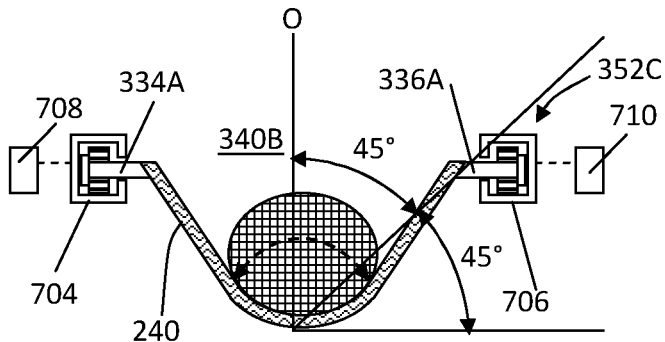
FIGS. 7A and 7B are schematic end views of a carrier supporting a honeycomb body according to another exemplary embodiment of the disclosure.
Figure 7B:
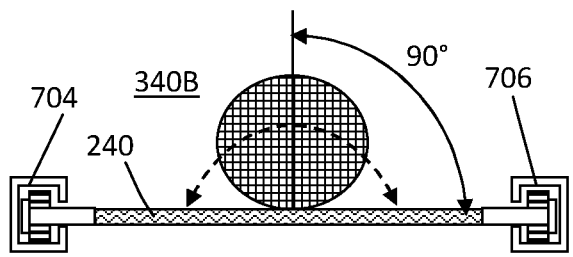

In FIGS. 7A and 7B side supports 334A, 334B, 336A, 336B are horizontally coupled to first rail 704 and second rail 706. In FIG. 7A first side support 334A, 334B and second side support 336A, 336B horizontally couple to first rail 704 and second rail 706 at about 45° positions relative to a directly overhead position "O" of the honeycomb body 220. In FIG. 7B first side support 334A, 334B and second side support 334B 336A, 336B are horizontally coupled to first rail 704 and second rail 706 at about 90° positions relative to the directly overhead position O of the honeycomb body 220. It will be understood that the first side support 334A, 334B and second side support 336A, 336B can go from the overhead position to the 45° or the 90° position by a change in the position of the first rail 704 and the second rail 706 while carrier 340B is transported along the first rail 704 and the second rail 706 or while the carrier 340B is stationary.

First side support 334A, 334B and second side support 336A, 336B can be horizontally coupled to first rail 704 and second rail 706 by coupling members 352C. Coupling members 352C can include a mechanism to attach first side support 334A, 334B and second side support 336A, 336B to C-channel rails 704, 706 and a conveying mechanism such as gear and sprocket, hook and chain or cable, and/or wheels that move along the C-channel rails 704, 706. A drive mechanism or first and second drive mechanisms 708, 710 can provide motive force to move the coupling mechanism 352 along the C-channel rails 704, 706.

Figures 8A, 8B:
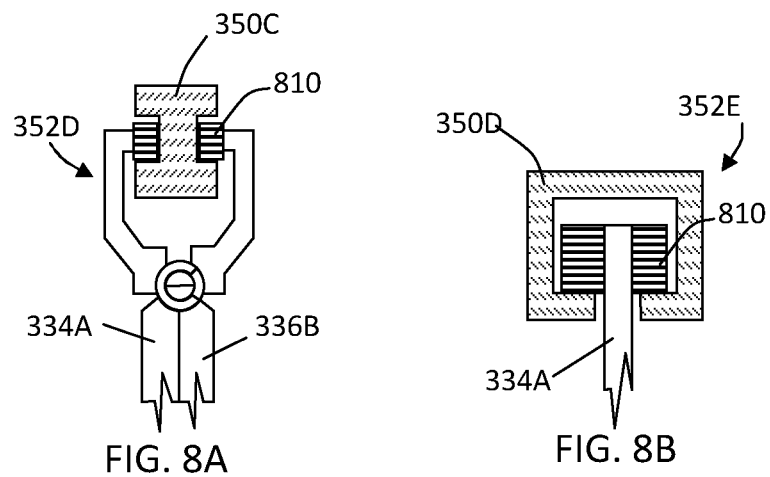
FIGS. 8A and 8B are schematic end views of coupling members to connect a carrier to conveyor rails according to exemplary embodiments of the disclosure.

FIGS. 8A and 8B are schematic end views of coupling members 352D, 352E to connect a carrier 230, 340, 340A to conveyor rails 350, 350A, 350B, 704, 706 according to exemplary embodiments of the disclosure. In FIG. 8A the conveyor rail comprises an I-beam 350C and first side support 334A, 334B and second side support 336A, 336B can be brought together to couple attachment device 810 such as gears, wheels, or hooks to the I-beam 350C. In FIG. 8B the conveyor rail comprises a C-beam or C-channel 350D and first side support 334A, for example, can couple to the C-channel 350D with attachment device 810 such as gears, wheels, or hooks to the C-channel 350D.

Figure 9:
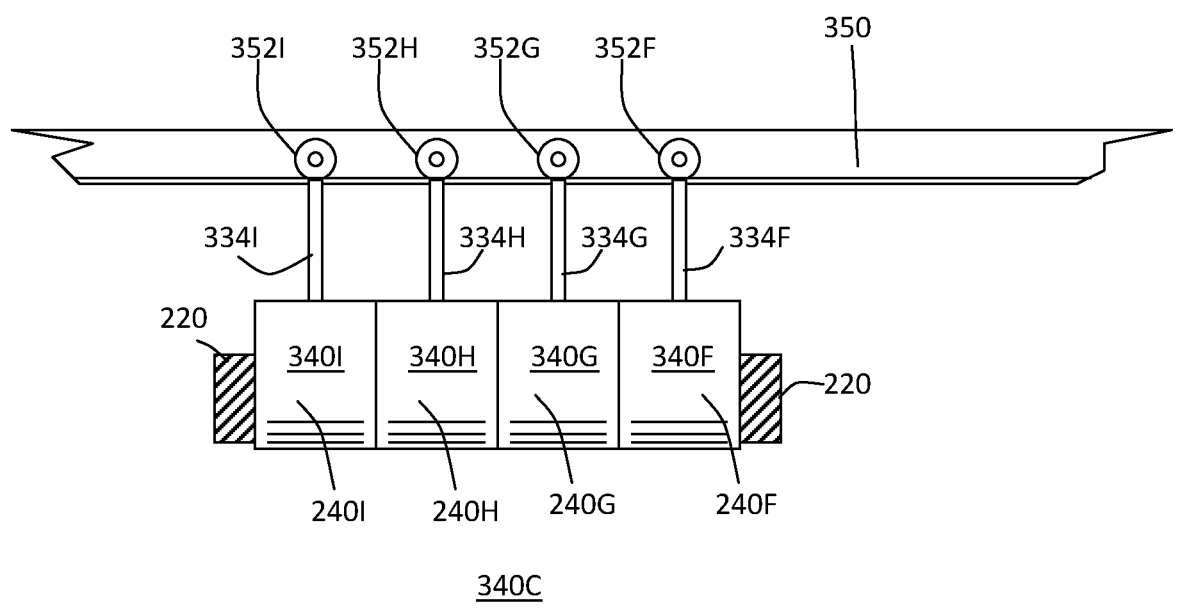
FIG. 9 is a schematic side view illustration of carrier segments supporting a honeycomb body according to another exemplary embodiment of the disclosure.

FIG. 9 is a schematic side view illustration of carrier segments 340F, 340G, 340H, 3401 supporting a honeycomb body 220 according to another exemplary embodiment of the disclosure. As illustrated, the honeycomb body 220 can extend longitudinally beyond the ends of the carrier support 340C comprised of carrier segments 340F, 340G, 340H, 3401. Each carrier segment 340F, 340G, 340H, 3401 can comprise a flexible sheet 240F, 240G, 240H, 2401, side supports, for example, first side supports 334F, 334G, 334H, 3341, and coupling mechanisms 352F, 352G, 352H, 3521 to couple to rail 350. The segmented carrier 340C provides additional adaptability to accommodate various honeycomb body 220 lengths, and/or further variations in honeycomb body 220 bow and/or diameter. For example, a 20 inch (51 cm) honeycomb body 220 can be transported by ten 2 inch (5 cm) wide segments, where the width is in the longitudinal direction.

According to exemplary embodiments of the disclosure, a flexible sheet suspended between two supports can provide uniform support to a honeycomb body to reduce point loading, reduce solid surfaces that may disrupt a microwave drying field, and reduce the need for contour specific honeycomb body trays.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A honeycomb body carrier system comprising:
a carrier comprising:
a first side support;
a second side support;
one or more rails;
an overhead conveyor;
a flexible sheet suspended between the first and second side supports for supporting the honeycomb body;
a tray base disposed above the flexible sheet and coupled to the overhead conveyor, the tray base supporting the first side support and the second side support;
wherein the first and second side supports are coupled to the one or more rails via the overhead conveyor to convey the carrier along the one or more rails; and
a honeycomb body that has a circular cross-section and is located on a support surface at a center portion of the flexible sheet of the carrier such that the center portion defines a contour area that circumferentially engages an outer peripheral surface of the honeycomb body.

2. The carrier of claim 1, wherein the tray base comprises a first longitudinal side and a second longitudinal side separable from the first longitudinal side to open the flexible sheet.

3. The carrier of claim 1, wherein at least one of the first side support and the second side support is configured to be adjustable from one another a first distance to a second distance less than the first distance, wherein at the first distance the flexible sheet center hangs to a first level and at the second distance the flexible sheet hangs to a second level greater than the first level.

4. The carrier of claim 1, wherein the first side support, the second side support, and the flexible sheet are comprised of low dielectric loss material.

5. The carrier of claim 1, wherein the first side support and the second side support comprise at least one of alumina and aluminosilicate fibers.

6. The carrier of claim 1, wherein the flexible sheet comprises at least one of silicone, polypropylene, extreme temperature silicone rubber, canvas, urethane, and fiberglass.

7. A carrier for a honeycomb body, the carrier comprising:
first and second side rails;
a first side support;
a second side support;
first and second drive mechanisms; and
a flexible sheet suspended between the first and second side supports for supporting the honeycomb body,
wherein the first and second side supports are respectively coupled to the first and second side rails via the first and second drive mechanisms to convey the carrier along the one or more rails; and
wherein an angle of the flexible sheet with respect to a directly overhead position is set by a change in position between the first rail and the second rail.

8. A method of manufacturing a ceramic honeycomb body, the method comprising:

forming a green honeycomb body having a circular cross-section and an outer peripheral surface from a batch mixture;

placing the green honeycomb body on a support surface at a center portion of a flexible sheet suspended between a first side support and a second side support of a honeycomb body carrier, such that the center portion of the flexible sheet defines a contour area that circumferentially engages the outer peripheral surface of the honeycomb body, wherein a tray base of the honeycomb body carrier is disposed above the flexible sheet and coupled to an overhead conveyor, wherein the first and second side supports are supported by the tray base and coupled to one or more rails via the overhead conveyor; and transporting the honeycomb body carrier, having the green honeycomb body disposed on the support surface of the flexible sheet, along the one or more rails via the overhead conveyor.

9. The method of any one of claim 8, wherein placing comprises separating the first side support from the second side support in a transverse direction, placing the green honeycomb body on the flexible sheet, and bringing the first side support and the second side support toward one another in the transverse direction.

10. The method of any one of claim 8, wherein placing comprises lifting the green honeycomb body and setting the green honeycomb body on the flexible sheet.

\* \* \* \* \*